US010242683B2

United States Patent
Nagle et al.

(10) Patent No.: US 10,242,683 B2
(45) Date of Patent: *Mar. 26, 2019

(54) OPTIMIZED MIXING OF AUDIO STREAMS ENCODED BY SUB-BAND ENCODING

(71) Applicant: ORANGE, Paris (FR)

(72) Inventors: Arnault Nagle, Lannion (FR); Claude Lamblin, Tregastel (FR); Balazs Kovesi, Lannion (FR)

(73) Assignee: Orange, Paris (FR)

( * ) Notice: Subject to any disclaimer, the term of this patent is extended or adjusted under 35 U.S.C. 154(b) by 515 days.

This patent is subject to a terminal disclaimer.

(21) Appl. No.: 14/773,305

(22) PCT Filed: Mar. 24, 2014

(86) PCT No.: PCT/FR2014/050684
§ 371 (c)(1),
(2) Date: Sep. 4, 2015

(87) PCT Pub. No.: WO2014/154989
PCT Pub. Date: Oct. 2, 2014

(65) Prior Publication Data
US 2016/0019903 A1 Jan. 21, 2016

(30) Foreign Application Priority Data

Mar. 25, 2013 (FR) ..................... 13 52677

(51) Int. Cl.
*G10L 25/93* (2013.01)
*G10L 19/16* (2013.01)
(Continued)

(52) U.S. Cl.
CPC ............ *G10L 19/167* (2013.01); *G10L 19/24* (2013.01); *H04M 3/568* (2013.01); *G10L 19/008* (2013.01);
(Continued)

(58) Field of Classification Search
CPC ..... G10L 19/167; G10L 19/24; G10L 19/173; G10L 19/008; G10L 2019/0014; G10L 2025/937; H04M 3/568
See application file for complete search history.

(56) References Cited

U.S. PATENT DOCUMENTS 7,619,995 B1    11/2009   El-Hennawey et al.
2004/0104768 A1*  6/2004  McGrath ............... H03F 1/0277
                                                     330/51
(Continued)

OTHER PUBLICATIONS

Hiwasaki Y. et al., "ITU-T G.711.1:Extending G.711 to Higher-Quality Wideband Speech", IEEE Communications Magazine, IEE Service Center, Piscataway, vol. 47, No. 10, Oct. 1, 2009, pp. 110-116, XP011283324.

(Continued)

*Primary Examiner* — Walter Yehl
(74) *Attorney, Agent, or Firm* — Haverstock & Owens LLP

(57) ABSTRACT

The invention relates to a method for mixing a plurality of audio streams coded according to a frequency sub-band coding, comprising the steps for decoding (E201) a part of the coded streams over at least a first frequency sub-band, for summing (E202) the streams thus decoded so as to form at least a first mixed stream. The method is such that it comprises the steps for detection (E203), over at least a second frequency sub-band different from the at least first sub-band, of the presence of a predetermined frequency band in the plurality of coded audio streams and for summing (E205) the decoded audio streams (E204) for which the presence of the predetermined frequency band has been detected, over said at least a second sub-band, so as to form at least a second mixed stream.

(Continued)

The invention also relates to a mixing device implementing the method described and may be integrated into a conference bridge, a communications terminal or a communications gateway.

14 Claims, 7 Drawing Sheets

(51) Int. Cl.
  *H04M 3/56* (2006.01)
  *G10L 19/24* (2013.01)
  *G10L 19/00* (2013.01)
  *G10L 19/008* (2013.01)

(52) U.S. Cl.
  CPC .... *G10L 19/173* (2013.01); *G10L 2019/0014* (2013.01); *G10L 2025/937* (2013.01)

(56) References Cited

U.S. PATENT DOCUMENTS

| | | | |
|---|---|---|---|
| 2008/0101577 A1* | 5/2008 | Frankel | H04M 3/56 379/202.01 |
| 2009/0313009 A1* | 12/2009 | Kovesi | G10L 19/24 704/203 |
| 2011/0173008 A1* | 7/2011 | Lecomte | G10L 19/20 704/500 |
| 2012/0065753 A1* | 3/2012 | Choo | G10L 19/18 700/94 |
| 2012/0065965 A1* | 3/2012 | Choo | G10L 21/038 704/203 |
| 2012/0185255 A1* | 7/2012 | Virette | G10L 19/002 704/500 |
| 2015/0051906 A1* | 2/2015 | Dickins | G10L 25/78 704/210 |
| 2016/0019902 A1* | 1/2016 | Lamblin | H04M 3/568 704/500 |

* cited by examiner

OPTIMIZED MIXING OF AUDIO STREAMS ENCODED BY SUB-BAND ENCODING

The present invention relates to the processing of a plurality of coded audio streams such as mixing, multiplexing of signals, transcoding, decoding, processing operations in the coded domain and other particular processing operations.

These processing operations can be carried out in equipment of the mixing and/or multiplexing conference bridge type, communications terminals, communications gateways, etc. . . .

The invention can thus be implemented in an audioconferencing context both over synchronous networks (RNIS, RTC, etc. . . . ) and over asynchronous networks (IP, ATM, FRAME RELAY, etc. . . . ). The streams may come from heterogeneous networks and have undergone different processing operations (for example may have been coded by different audio compression systems).

The invention relates in particular to the streams obtained by sub-band coding algorithms such as the standardized UIT-T G.711.1 and G.722 coders. It is aimed in particular at the processing operations of the mixing type and/or for replication of audio streams.

The most common applications for such processing operations are multi-party communications such as the audio-conference or the video-conference.

Two communication configurations are generally considered: one using a mesh architecture with terminals linked point to point, another using a centralized architecture with a multipoint control unit (MCU in English).

In the case of a centralized architecture, the control unit comprises a bridge—central point which either "sums" the audio stream (principle of mixing) or duplicates the audio stream (principle of replication). Two main categories of bridge therefore exist: the mixing bridge and the replicating bridge.

The principle of operation of the replicating bridge is illustrated in FIG. 1a.
Each transmitter terminal ($T_0, \ldots, T_j, \ldots, T_{N-1}$) sends its audio stream $Be_j$ to the bridge P, which stream is obtained by coding (COD.) of its input signal $Se_j$, whether this be of the mono, stereo or multichannel type.

The bridge transmits to each receiver terminal ($T_i$) the stream ($Be_0, \ldots, Be_{i-1}, Be_{i+1}, \ldots, Be_{N-1}$) from the N transmitter terminals. From the N input signals received, for each output i, the bridge transmits the (N−1) streams received from the inputs ($E_j$) ($0 \le j < N$, $j \ne i$) to the terminal i. In the FIG. 1a, the terminal $T_i$ receives N−1 streams from the bridge corresponding to the N−1 other terminals ($T_0, \ldots, T_{i-1}, T_{i+1}, \ldots, T_{N-1}$).

The bridge therefore just needs to duplicate the streams, to multiplex them (MUX.), in order to transmit them to the respective terminals via its output module $S_i$. Thus, the advantages of this type of bridge are that it does not need significant software resources and can therefore support numerous conferences, that it does not need to carry out operations for coding and decoding the audio streams, which avoids the loss of audio quality and the generation of an additional delay.

The terminals which receive the duplicated streams can independently manage the spatialization of these streams where necessary.

On the other hand, the software resources and the processing capacities of the terminals must be greater in order to process the received streams by demultiplexing them (DEMUX.), by decoding them (DECOD.) and by mixing them (MIX.) and, where needed, by spatializing them in order to obtain the mixed signal $S_{Mi}$. Thus, the number of participants in a conference may be limited by the capacities of the terminals.

Depending on the number of audio streams to be transmitted in the datastream downloaded to a terminal, the corresponding bandwidth may be large. The terminals must have the same type of coders/decoders for managing the datastream, and hence potentially possess a large set of coders/decoders.

The principle of operation of a mixing bridge is illustrated in FIG. 1b and is now described.

Each transmitter terminal ($T_0, \ldots, T_j, \ldots, T_{N-1}$) sends its audio stream $Be_j$ to the bridge P, which stream is obtained by coding (COD.) its input signal $Se_j$, whether this be of the mono, stereo or multichannel type.

The bridge performs the mixing (MIX.) of the streams then the routing toward the terminals concerned. From the N received input signals, the bridge prepares the N output signals to be transmitted by summation. Thus, the sum of the (N−1) signals from the inputs ($E_j$) ($0 \le j < N$, $j \ne 0$ is directed toward the output $S_i$ ($0 \le i < N$). For this, the audio bridge firstly carries out the decoding (DECOD.) of the incoming binary streams, then, for each output i, the (N−1) decoded signals from the inputs ($E_j$)($0 \le j < N$, $j \ne 1$) are added together and this mixed signal is re-encoded (COD.) prior to being transmitted to the terminal i. The terminal i obtains the decoded mixed signal $S_{Mi}$ by decoding (DECOD.) the streams $Bs_i$. In the following, mixed stream will refer to the re-encoded signal.

In FIG. 1b, the terminal i receives the mixed stream $Bs_i$ via the bridge P from the N−1 streams ($Be_0, \ldots, Be_{i-1}, Be_{i+1}, \ldots, Be_{N-1}$) received and decoded from the other terminals ($T_0, \ldots, T_{i-1}, T_{i+1}, \ldots, T_{N-1}$).

In contrast to the principle of the replicating bridge, this principle concentrates the software capacities and resources on the mixing bridge rather than in the receiver terminals. The smart central processing entity allows a large number of participants to be managed. The spatialization block may be integrated into the bridge in such a manner as to manage a common audio scene between all the participants. The bandwidth needed for the transmission of the mixed stream to the terminals does not need to be significant even with a large number of participants. The terminals do not need to have the same type of codec as long as the bridge has the required codecs.

On the other hand, the processing operations and the resources required are therefore more significant on the bridge. It is more difficult to manage a spatialization independently in the terminals and the audio quality is poorer owing to the decoding and coding operations carried out on the bridge.

In a mesh teleconference architecture, the various terminals are in point-to-point communication. In the conventional case, the (N−1) audio streams arriving at a terminal are fully decoded prior to being mixed in the time domain. The advantages and drawbacks for the terminals of a replicating bridge are again found.

A conventional method for combination of the audio streams in the field of coding by sub-band is described for example in Appendix I of the recommendation UIT-T G.722 ("7 kHz audio-coding within 64 kbit/s", September 2012). A description of the G.722 codec will also be presented further on.

In order to describe this method, assuming a bridge with N input channels (receiving N hierarchical binary streams coded by the G.722 at 64 kbit/s), the following notations are used for each channel j (0≤j<N):

Be$_j^l$ the incoming low sub-band binary stream at 48 kbit/s (composed of the core layer at 32 kbit/s and of two improvement layers of 8 kbit/s each)

Be$_j^h$ the incoming high sub-band binary stream at 16 kbit/s s$_j^l$ the reconstructed signal of the low sub-band obtained by decoding the stream Be$_j^l$ s$_j^h$ the reconstructed signal of the high sub-band obtained by decoding the stream Be$_j^h$ The following notations are also used for each output channel (0≤i<N):

Bs$_i^l$ the outgoing low sub-band binary stream (composed of the core layer and of two improvement layers)

Bs$_i^h$ the outgoing high sub-band binary stream

In this method, the procedure for combining the binary streams (Bs$_i^l$; Bs$_j^h$) toward a plurality of terminals Ti (0≤i<N) is as follows:

A. Obtain the N low sub-band signals s$_j^l$ by decoding low sub-band binary streams Be$_j^l$, 0≤j<N B. Obtain the N high sub-band signals s$_j^h$ by decoding high sub-band binary streams Be$_j^h$, 0≤j<N C. Obtain the low sub-band binary stream (Bs$_i^h$) to be transmitted to a terminal Ti (0≤i<N) by:

C1. Summing of N−1 reconstructed signals of the low sub-band: S$_i^l$=Σs$_j^l$; 0≤j<N, j≠i C2. Coding by the low sub-band encoder of the G.722 (ADPCM (Adaptative Differential Pulse-Code Modulation) over 6 bits) of this sum signal S$_i^l$ in order to obtain the low sub-band output binary stream Bs$_i^l$ D. Obtain the high sub-band binary stream (Bs$_i^h$) to be transmitted to a terminal Ti (0≤i<N) by:

D1: Summing of N−1 reconstructed signals of the high sub-band: S$_i^l$=Σs$_j^l$; 0≤j<N, j≠i D2. Coding by the high sub-band encoder of the G.722 (ADPCM over 2 bits) of this sum signal S$_i^h$ in order to obtain the high sub-band output binary stream Bs$_i^h$.

This method allows a good quality to be obtained since all the audio streams in all the frequency sub-bands are taken into account during the mixing of the streams. However, this good quality is achieved at the detriment of a significant processing complexity, either within the mixing bridge or within the terminal depending on the configuration of the network.

In order to reduce the complexity of the mixing of coded streams, one technique, for example described in the document entitled "Tandem-free VoIP conferencing: a bridge to next-generation networks" by the authors Smith, P. J., Kabal, P., Blostein M. L., Rabipour, R in IEEE Communications Magazine vol. 41, No. 5, May 2003, consists in limiting the number of streams re-transmitted in the multipoint and hence in only applying the mixing to a part of the received signals.

Several strategies exist for selecting the coded streams that are taken into account: for example, only the streams with the highest intensity (LT criterion in English for "Loudest Talker") are considered. Another criterion rather than being based on energy is based on timing, referred to as FCFS ("First Come First Serve" in English), uses a prioritizing of the channels according to the order in which the participants start speaking; this criterion relies on a detection of voice activity. For example, in the case of transmission of the audio stream in packets according to the RTP protocol with extension of the header such as described in RFC 6464 (J. Lennox, E. Ivov, E. Marocco, "A Real-time Transport Protocol (RTP) Header Extension for Client-to-Mixer Audio Level Indication", RFC 6464, December 2011), the header comprises an indication of the level of the audio stream and potentially an indicator of voice activity, which facilitates this selection of the streams in mixing equipment (such as a bridge).

Depending on the system, the number of streams selected may be fixed or variable. Generally speaking, it is considered that the selection of two or three streams allows a good compromise between reduction in complexity and maintaining a good level of participation. The FCFS criterion uses VAD ("Voice Activity Detector" in English) decisions, whereas the LT criterion requires a measurement of the power of the signal or of its energy.

The reduction in the number of inputs is also used in the replicating bridge in order to reduce the download data rate to the remote terminals and to reduce the complexity of the processing in these terminals.

When a selection of the streams is carried out (active streams, highest energy streams, etc.), the procedure for combining the streams according to the prior art is as follows:

A'. Selection according to one of the criteria described hereinabove of the set V'(of the indices) of the N' input channels B'. Obtain the N' low sub-band signals s$_j^l$ by decoding low sub-band binary streams Be$_j^l$, j∈V'

C'. Obtain the N' high sub-band signals s$_j^h$ by decoding high sub-band binary streams Be$_j^l$, j∈V'

D'. Obtain the low sub-band binary stream (Bs) to be transmitted to a terminal Ti (0≤i<N) by:

D'1. if i∈V', summing of N=1 reconstructed signals of the low sub-band: S$_i^l$=Σs$_j^l$; j∈V'−{i}; otherwise (i∉V') S$_i^l$=Σs$_j^l$; j∈V'

D'2. Coding by the low sub-band encoder of the G.722 (ADPCM over 6 bits) of this sum signal S$_i^l$ in order to obtain the low sub-band output binary stream Bs$_i^l$.

E'. Obtain the high sub-band binary stream (Bs$_i^h$) to be transmitted to a terminal Ti (0≤i<N) by:

E'1: if i∈V', summing of N' reconstructed signals of the high sub-band: S$_i^h$=Σs$_j^h$; j∈V'−{i}; otherwise (i∈V') S$_i^h$=Σs$_j^h$; j∈V'

E'2. Coding by the high sub-band encoder of the G.722 (ADPCM over 2 bits) of this sum signal S$_i^h$ in order to obtain the high sub-band output binary stream Bs$_i^h$ The reduction in complexity provided by the selection of a sub-set of input channels to be combined depends on the size N' of the set of channels to be combined. At the steps B' and C', the number of decodings may be reduced from N to N'; at the steps D'1 and E'1, the number of additions/of summations is reduced from 2N (or N(N−1)) to 2N'(or N'(N'−1)) as explained further on. In addition, the signals S$_i^l$ and S$_i^h$ being the same for the outputs i, i∈V', the number of re-coding at the steps D'2 and E'2 can be reduced from N to N'+1.

This technique indeed allows the processing complexity to be reduced. However, the mode of selection of the streams to be mixed does not necessarily allow the best quality of the mixed stream to be obtained in terms of representativity of the participants.

On the other hand, with regard to the audio streams able to be mixed, it should be pointed out that the latter may be coded according to various coding formats and over different frequency band widths.

HD (High Definition) codecs are indeed capable of efficiently compressing the voice over a wide band of frequencies. They allow the voice to be transmitted in HD quality encoded over a frequency range going from 50 Hz to 7 kHz (wide band).

HD voice aims to provide a listening quality and comfort not known until now over the conventional telephone networks. Its advantages for the users are, on the one hand, functional; the widening of the frequency band enhancing the intelligibility and the listening comfort favoring long conversations; but also emotional in nature. The reproduction of the major part of the speech spectrum indeed ensures the fidelity of the voice and a true sensation of presence. Ultimately, "super-HD" (super-wideband SWB) voice up to 15 kHz or even "Hifi" (or fullband FB) over the entirety of the audible band of frequencies [20 Hz-20 kHz] is envisioned.

HD Voice requires a chain of communication that is compatible from end to end, in other words from the microphone to the sound generator of the remote terminal. It relies on coding formats guaranteeing the wideband quality and which, being standardized, ensure the interoperability between the various elements of the chain.

In the telecommunications industry, three HD formats are particularly employed: the UIT-T G.722 coder described for example in the document "Rec. ITU-T G.722, 7 kHz audio-coding within 64 kbit/s, September 2012", the coder UIT-T G.711.1 described for example in the document "Rec. IUT-T G.711.1, Wideband embedded extension for G.711 pulse code modulation, 2008", for wideband communications over fixed networks and the 3GPP AMR-WB coder described for example in the document "3GPP TS 26.190 V10.0.0 (2011-03) 3rd Generation Partnership Project; Technical Specification Group Services and System Aspects; Speech codec speech processing functions; Adaptive Multi-Rate—Wideband (AMR-WB) speech codec; Transcoding functions (Release 10)" for those over mobile networks. For other HD coders, the UIT-T G.729.1 coder may be mentioned, hierarchical extension of the narrow-band coder G.729. Schematically, roll-out in the market of HD Voice requires two components. A telecommunications network of compatible with the wideband coders is first of all required—in other words transparent to these coding formats—and with a guaranteed Quality of Service. Terminals running the wideband coder inter-operating with the network are also required, and whose acoustic characteristics preserve the HD Voice quality.

The dynamism of the multimedia communications sector and the heterogeneity of the networks, access and terminals have lead to a proliferation of compression formats. There exist numerous methods for compression of the media signals in order to reduce the data rate while at the same time maintaining a high quality.

The presence in the chains of communication of various compression formats requires several cascaded codings (transcoding). Transcoding is necessary when, in a transmission chain, a compressed signal frame generated by a coder can no longer continue along its path in this format. Transcoding allows this frame to be converted into another format compatible with the following part of the transmission chain. The most elementary solution (and the most widely employed currently) is the placing end-to-end of a decoder and a coder. The compressed frame arrives in a first format, it is decompressed. This decompressed signal is then re-compressed in a second format accepted by the following part of the chain of communication. This cascading of a decoder and of a coder is referred to as a tandem.

It should be noted that, during a tandem, coders coding different frequency ranges can be cascaded. Thus, a wideband coder may be used to code an audio content with a more restricted band than the wide band. For example, the content to be coded by the fixed HD coders (G.722 and G.711.1) although sampled at 16 kHz can only be in telephony band because previously coded by a narrow-band coder (such as the standard UIT-T G.711). It is also possible that the limited quality of the acoustics of the transmitter terminal does not allow the whole of the wide band to be covered.

It can therefore be seen that the audio band of a stream coded by a coder operating on signals sampled at a given sampling frequency may be much more limited than that supported by the coder. Moreover, in many applications, the knowledge of the audio band of a content to be processed—in particular taking into account the presence of a predetermined frequency band within the coded stream (the presence of a frequency band indicating that there is a relevant content)—is useful.

Thus, it is important to preserve the high-frequency content when the latter exists in an audio stream so as to improve the listening comfort of a listener.

There therefore exists a need to reduce the complexity of the mixing of a plurality of audio streams while at the same time preserving a listening comfort that may be appreciated by a listener receiving a mixed stream.

The present invention aims to improve the situation.

For this purpose, it provides a method for mixing a plurality of audio streams coded according to a frequency sub-band coding, comprising the following steps:
decoding of a part of the coded streams over at least a first frequency sub-band;
summing of the streams thus decoded so as to form at least a first mixed stream.

The method is such that it comprises the steps for:
detection, over at least a second frequency sub-band different from the at least first sub-band, of the presence of a predetermined frequency band within the plurality of coded audio streams;
summing of the decoded audio streams for which the presence of the predetermined frequency band has been detected, over said at least second sub-band, so as to form at least a second mixed stream.

Thus, the number of streams to be mixed over the second frequency sub-band is reduced since only the streams containing a predetermined frequency band are retained. The mixing according to this method has a reduced complexity while at the same time allowing for example the HD content of the streams to be preserved for an optimum quality of the combined streams.

The various particular embodiments mentioned hereinafter may be added, independently or in combination with one another, to the steps of the method of mixing defined hereinabove.

In one particular embodiment, the method furthermore comprises a step for pre-selection of the coded audio streams according to a predetermined criterion, prior to the detection step.

The pre-selection allows the number of streams to be mixed to be reduced and hence the complexity of the mixing to be reduced. Moreover, the verification of the presence of the frequency band is then carried out on a limited number of streams, which further reduces the complexity of the method.

The predetermined criterion may for example be an energy and/or voice activity criterion.

In one possible application to a central bridge controller (MCU) managing several terminals, the method furthermore comprises a step for re-coding mixed streams.

In one particular embodiment, the decoding step is carried out on low frequency sub-bands and the predetermined frequency band for the detection step is a frequency band higher than said low frequency sub-bands.

This is notably applicable in the sub-band coders that allow HD content to be obtained. The presence of this HD content in a coded stream conditions its selection for constituting the mixed HD audio stream to be transmitted. This is also applicable to coders operating at sampling frequencies higher than 16 kHz, such as the super-HD coder from France Telecom (with four sub-bands coded by ADPCM technology), or the OPUS coder described in the RFC 6716 from the IETF (Valin, J M., Vos, K., and T. Terriberry, "Definition of the Opus Audio Codec", RFC 6716, September 2012.) which comprises a hybrid mode where the low frequencies (<8 kHz) are coded by a coding technology using linear prediction and the high frequencies by a transform coding technology.

In one embodiment, the detection of the presence of a predetermined frequency band within a coded stream is carried out by a comparison of energy, within the various frequency sub-bands, of the decoded audio streams.

This is applicable in any type of sub-band coding such as the coding of the G.722 or G.711.1 type. On the other hand, this technique requires a decoding of the streams prior to the detection step.

For certain coding technologies, methods for detection of the presence or absence of a frequency band (relevant content) which does not require a complete decoding of the streams have been provided. For example, for transform coders or those using sub-band coding such as MPEG coders (e.g. MP3, AAC, etc.) whose coded stream comprises coded spectral coefficients, such as for example, the MDCT coefficients in the MP3coder, the idea of the document "Liaoyu Chang, Xiaoqing Yu, Haiying Tan, Wanggen Wan, Research and Application of Audio Feature in Compressed Domain, IET Conference on Wireless, Mobile and Sensor Networks, 2007; (CCWMSN07), Page(s): 390-393, 2007", rather than decoding the whole signal, is to decode only the coefficients for determining the characteristics of the coded signal such as the bandwidth of the coded audio content. Preferably, the invention uses a detection method without complete decoding of the streams when such a method exists for the coding technology used. This then allows the complexity of the detection to be significantly reduced. Advantageously, the results of these partial decodings are saved in memory for a later use during the complete decoding of the audio stream to be mixed.

In another embodiment of the invention, the detection of the presence of a predetermined frequency band within a coded stream is carried out according to the following steps:
- determination, by frequency sub-band, from a predetermined set of sub-bands, of a signal estimated based on the coded stream;
- determination by frequency sub-band, from the predetermined set of sub-bands, of uncoded parameters representative of the audio content, based on the corresponding estimated signal;
- calculation of at least one local criterion based on the determined parameters;
- decision regarding the presence of a predetermined frequency band within at least one sub-band of the audio content as a function of the at least one calculated local criterion.

This is for example applicable for a coding of the G.722 type and allows the decoding of the audio streams prior to the detection step to be avoided. Only the detected streams are decoded. The complexity is therefore also reduced.

Advantageously, at least a part of the determined parameters, representative of the audio content, is saved in memory for a later use during the decoding of the audio stream to be mixed.

Thus, this allows the decoding steps to be simplified since certain parameters are no longer to be determined.

In one particular application, the method comprises:
- several steps for detection of a predetermined frequency band within coded audio streams, the detection of a first predetermined frequency band within a first sub-band allowing a first set of coded audio streams to be obtained, the detection of a second predetermined frequency band within a second sub-band allowing a second set of coded audio streams included within the first set to be obtained; and
- steps for summing decoded audio streams for each of the sets of coded audio streams obtained.

In this embodiment, the number of streams to be mixed for certain sub-bands (for example, the high sub-bands) is increasingly limited as the highest sub-band is approached. This allows, for certain sub-bands, both the mixing and the decoding of the streams to be simplified.

The invention may also be applied to a device for mixing a plurality of audio streams coded according to a frequency sub-band coding, comprising:
- a module for decoding a part of the coded streams over at least a first frequency sub-band;
- a module for summing the streams thus decoded so as to form at least a first mixed stream.

The device is such that it furthermore comprises:
- a module for detection, over at least a second frequency sub-band different from the at least first sub-band, of the presence of a predetermined frequency band within the plurality of coded audio streams;
- a module for summing the decoded audio streams for which the presence of the predetermined frequency band has been detected, over said at least a second sub-band, so as to form at least a second mixed stream.

The device has the same advantages as those of the method that it is implementing.

The invention relates to a conference bridge comprising a mixing device such as described, together with a communications terminal and a communications gateway comprising a mixing device such as described.

The invention is aimed at a computer program comprising code instructions for the implementation of the steps of the method of mixing such as previously described, when these instructions are executed by a processor.

Lastly, the invention relates to a storage media, readable by a processor, integrated or otherwise into the mixing device, potentially removable, on which a computer program is stored comprising code instructions for the execution of the steps of the method of mixing such as previously described.

Other features and advantages of the invention will become more clearly apparent upon reading the following description, presented solely by way of non-limiting example, and with reference to the appended drawings, in which:

FIG. 1a, previously described, illustrates the principle of operation of a replicating bridge according to the prior art;

FIG. 1b, previously described, illustrates the principle of operation of a mixing bridge according to the prior art;

Figure 1A:
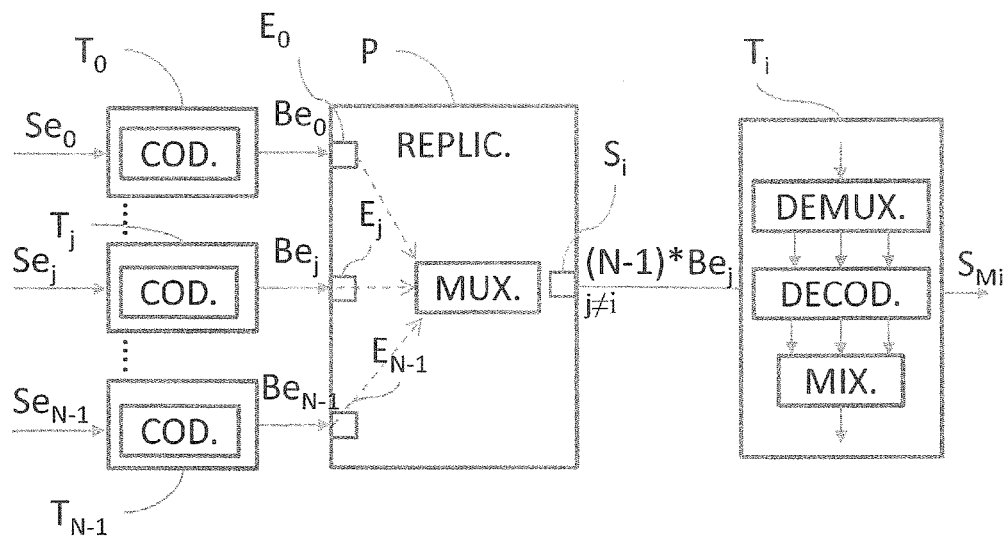
Figure 1B:
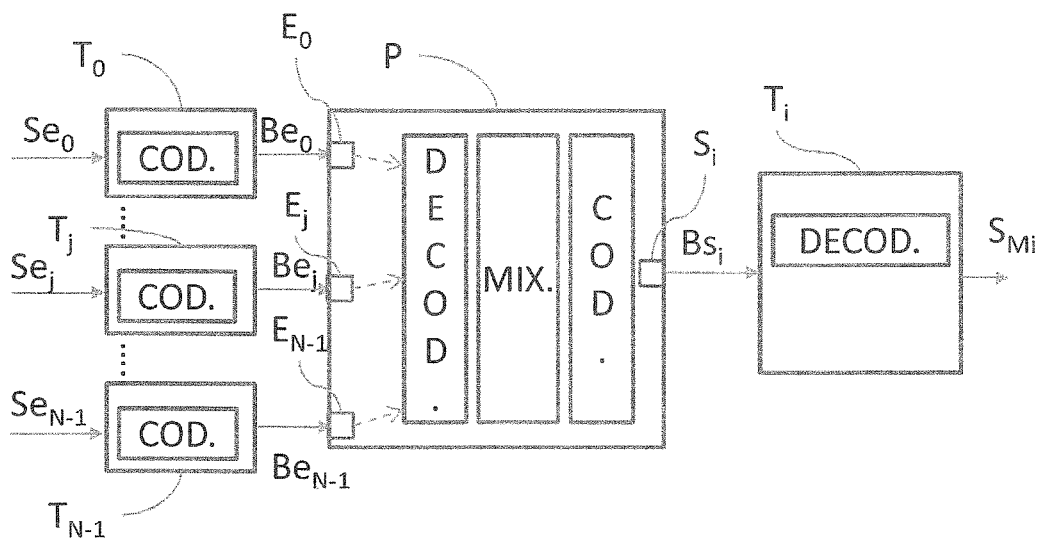
Figure 2:
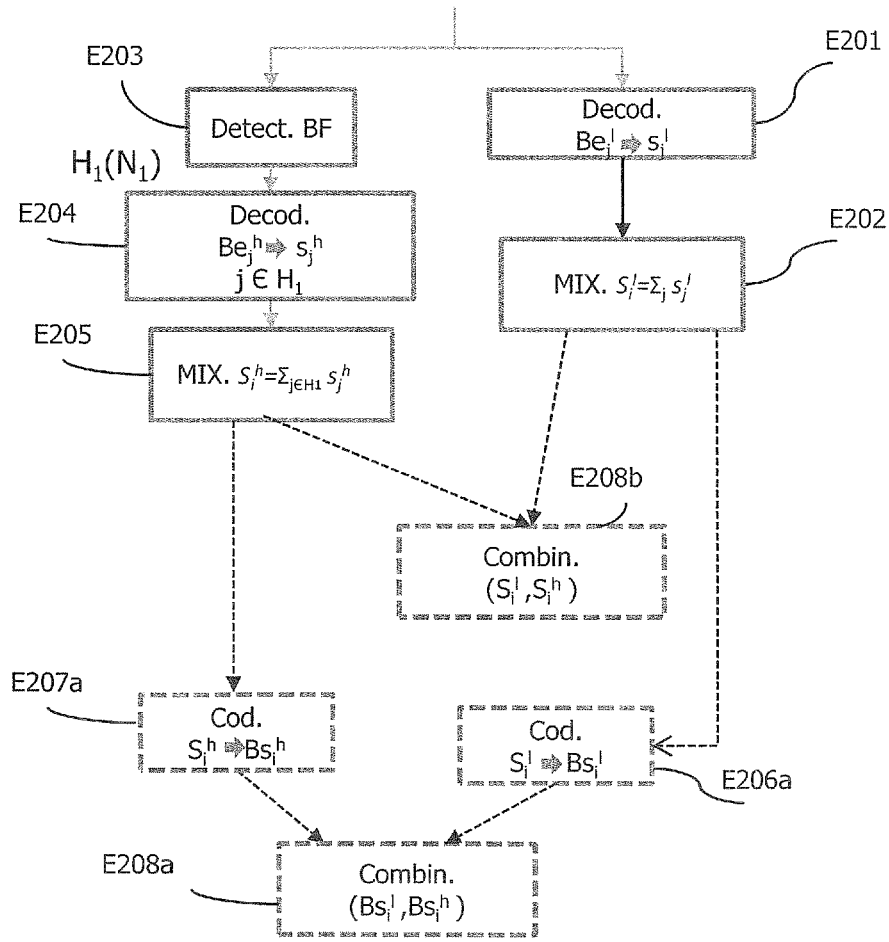
FIG. 2 illustrates the main steps of the method of mixing according to one embodiment of the invention.

FIG. 2 illustrates the main steps of one embodiment of the method of mixing according to the invention. Starting from a plurality (N) of streams ($Be_j = (Be_j^l, Be_j^h)$) coded according to a method of coding using frequency sub-bands, the method comprises a step at E201 for decoding a part of the received coded streams and over at least one frequency sub-band. Thus, starting from the binary streams $Be_j^l$ of a frequency sub-band, for example the low frequency sub-band, at the output of this decoding, the reconstructed signals $s_j^l$ of the low frequency sub-band are obtained.

At the step E202, a mixing of these streams is carried out over this at least one frequency band. The decoded streams are therefore added together so as to form a first mixed stream $S_i^l = \Sigma_j s_j^l$ (with $0 \le j < N$, and in the case of the centralized bridge $j \ne i$). In an optional step E206a, the mixed signal $S_i^l$ is coded in order to obtain a stream $Bs_i^l$.

Starting from the received coded streams, a step E203 is implemented for detecting the presence of a predetermined frequency band in the coded streams. The detection of a frequency band may be carried out in various ways. Exemplary embodiments will be described hereinbelow. At the output of this detection step, a set $H_1$ of streams containing the predetermined frequency band is obtained. This set comprises a number $N_1$ of streams with $N_1 \le N$.

For the sake of concision, in the following part, the case where the predetermined frequency band to be detected within a coded stream is a high frequency band is described. It will be obvious for those skilled in the art how to adapt this detection to other types of frequency band, for example to a low frequency band or else to a frequency band with a predefined range of values.

These $N_1$ streams, for which the presence of the predetermined frequency band has been detected, are decoded at the step E204. Thus, starting from the $N_1$ binary streams $Be_j^h$ of a frequency sub-band, for example the higher frequency sub-band, at the output of this decoding, the reconstructed signals $s_j^h$ of the high frequency sub-band are obtained, with $j \in H_1$.

At the step E205, a mixing of these streams is carried out over this frequency band. The decoded streams are therefore added together so as to form a second mixed stream $S_i^h = \Sigma s_j^h$ (with $j \in H_1$, and in the case of the centralized bridge $j \ne i$). In an optional step E207a, the mixed signal $S_i^h$ is coded in order to obtain a stream $Bs_i^h$. The second coded stream $Bs_i^h$ is combined at the optional step E208a for combining the binary streams with the first coded mixed stream $Bs_i^l$ obtained at the step E206a: ($Bs_i^l, Bs_i^h$), this stream thus combined constitutes the stream to be transmitted to the terminal i.

As a variant, in an optional step E208b, the second mixed stream of the high sub-band $S_j^h$ obtained at the step E205 is subsequently combined with the first mixed stream of the low sub-band $S_i^l$ obtained at the step E202, in order to form the stream to be reproduced.

This method is notably applied in a centralized bridge which receives N streams from various terminals and transmits the mixed stream to each of the terminals i after re-encoding.

It is also applicable to a terminal receiving N streams from other terminals and mixing according to the method these N received streams for reproducing to the terminal.

A first embodiment is now described for audio streams that have been coded according to a method of coding of the standardized UIT-T G.722 type.

Figure 3:
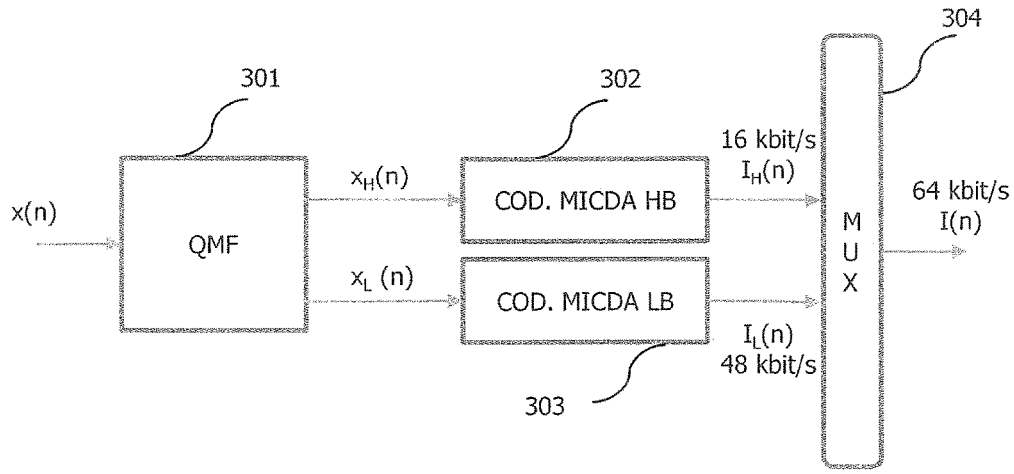
FIG. 3 illustrates a coder of the G.722 type delivering streams able to be mixed according to the method of the invention.

FIG. 3 illustrates this mode of coding. It is also described in the aforementioned document: "Rec. ITU-T G.722, 7 kHz audio-coding within 64 kbit/s, September 2012".

The G.722 coder codes the input signal (x(n)) sampled at 16 kHz into two sub-bands sampled at 8 kHz. The division into sub-bands is carried out by a quadrature mirror filter (QMF for Quadrature mirror filter in English) via the module 301. Starting from two input samples, the filter QMF yields one sample $x_L(n)$ of low band (0-4000 Hz) and one sample $x_H(n)$ of high band (4000-8000 Hz) at the output. The signals of the 2 sub-bands are coded independently by ADPCM (Adaptative Differential Pulse-Code Modulation) coders 302 and 303.

The indices of the two quantified prediction errors $I_H(n)$ and $I_L(n)$ are thus transmitted within the binary stream I(n) after multiplexing in 304. The G.722 coder has three data rates: 64, 56 and 48 kbit/s. Each sample of the low sub-band is coded over 6 bits at the highest data rate (48 kbit/s), over 5 bits at the intermediate data rate (40 kbit/s), and over 4 bits at the lowest data rate (32 kbit/s). At the highest data rate, the coded stream of the low sub-band is composed of the core layer at 4 bits per sample and of two improvement layers at 1 bit per sample each. The high sub-band is always coded over 2 bits (16 kbit/s) per sample independently of the data rate.

Figure 4:
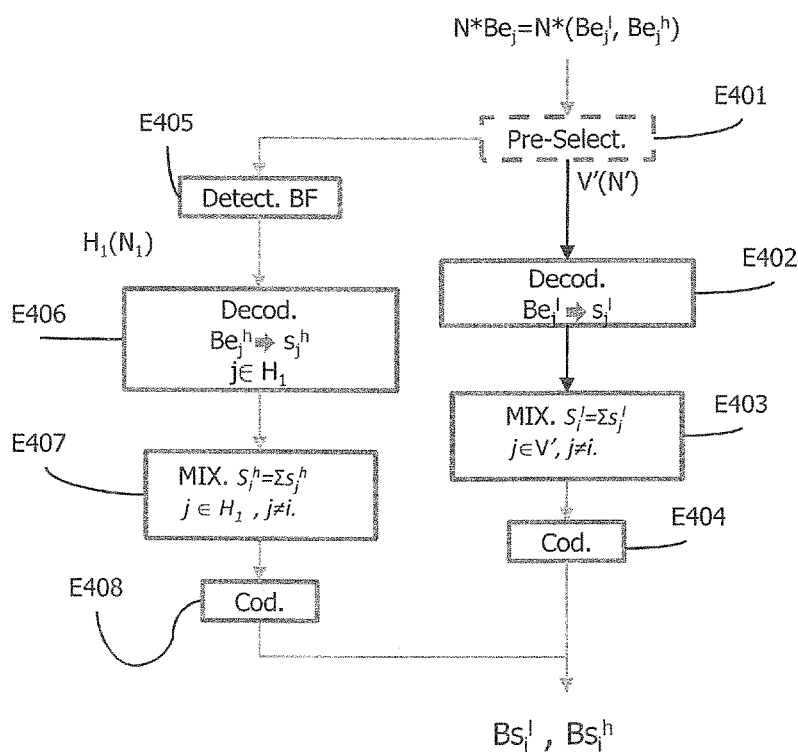
FIG. 4 illustrates the steps of one particular embodiment for coded streams of the G.722 type and implemented in a centralized bridge.

A first exemplary embodiment is now illustrated in FIG. 4 which shows the steps of the method according to the invention, implemented in a mixing device using a centralized architecture receiving streams coded by the UIT-T G.722 coder at 64 kbit/s. As previously mentioned, this coder is a sub-band coder, the signals of the two (M=2) sub-bands being coded by ADPCM technology.

Starting from N hierarchical binary streams (also hereinafter referred to as input channels), coded in this embodiment by the G.722 at 64 kbit/s, an optional step E401 for pre-selection of N' streams is implemented.

This pre-selection step allows the selection from amongst the various input channels of those which meet one or more of the selection criteria previously described for the methods of the prior art. For example, based on the detection of voice activity, the FCFS criterion (for "First Come First Serve") is used to select the streams. Or else, based on the measurement of the power of the signal or of its energy, the LT criterion (for "Loudest Talker") is used to select the streams with the highest intensity.

Thus, a part (N' with N'<N) of the coded streams received by the mixing device or mixing bridge is taken into account for implementing the method of mixing. This therefore reduces the complexity of implementation of the steps of the method, since the number of channels to be mixed is limited.

This pre-selection step is optional and the decoding step E402 can then be applied to all N of the input coded audio streams.

In the following, for the sake of clarity, the notation N' (with N'N) will be used whether this optional step is implemented or not and the set of the indices of these channels will be denoted V'.

The step E402 for decoding the N' streams in the low sub-band is subsequently implemented. As a variant, being particularly advantageous if the step E402 is not very complex, the pre-selection step E401 may be carried out after this decoding step E402 for all the low sub-band input streams.

Or again, as a complement, a second pre-selection step may be carried out after this decoding step in order, where required, to limit even more the number of channels to be taken into account in the processing of the high sub-band streams to be detected, mixed and to be re-encoded (steps E405 to E408) and/or in the processing of the low sub-band streams to be mixed and to be re-encoded (steps E403 to E404).

For these N' coded audio streams, for each channel j (j∈V'), the following notations are used:
  $Be_j^l$ the incoming low sub-band binary stream (composed of the core layer and of two improvement layers);
  $Be_j^h$ the incoming high sub-band binary stream.

At the decoding step E402, the reconstructed signal $s_j^l$ of the low sub-band is obtained by decoding the stream $Be_j^l$.

At the step E403, a procedure for mixing the binary streams thus decoded is carried out by summing N'−1 signals thus reconstructed of the low sub-band: $S_i^l = \Sigma s_j^l$ with j∈V', j≠i for a transmission of the stream to the terminal i. It should be noted that, if i∈V', $S_i^l$ is the sum of N'−1 signals, otherwise $S_i^l$ is the sum of N' signals.

The low sub-band output binary stream ($Bs_i^l$) intended to be transmitted to a terminal Ti (0≤i<N) is then obtained by coding at the step E404, by the low sub-band encoder of the G.722 (ADPCM over 6 bits), of this sum signal $S_i^l$.

Starting from the set N' of input channels, a step for detection of a predetermined frequency band E405 is carried out. In this embodiment, the predetermined frequency band is the high frequency band. This allows the presence of a HD content in a coded stream to be determined. Thus, an analysis of the audio content of the input channels is carried out.

Various modes for detection of the presence of the high frequency band are possible. For example, the method for detection of an HD content in a stream j can use a comparison of the energy of the reconstructed signal of the high sub-band, $s_j^h$, with that of the signal reconstructed of the low sub-band $s_j^l$. This embodiment requires a decoding of the audio stream to be analyzed in the high sub-band, in addition to the decoding of the low sub-band.

As an alternative, in order to avoid the decoding of the signals of the high sub-band, a method of detection with a lower cost of algorithm may be implemented. This method is described hereinbelow with reference to FIG. 5.

At the output of the step E405, a set $H_1$ of streams for which the presence of the predetermined frequency band has been detected is obtained. In this embodiment, these streams are those that have the HD content. The number of streams in the set $H_1$ is $N_1$, with $N_1 \leq N'$.

At the step E406, the audio streams $Be_j^h$ (with j∈$H_1$) of the set $H_1$ are decoded in order to obtain the $N_1$ reconstructed signals of the high sub-band $s_j^h$.

At the step E407, a mixing of the decoded streams of the set $H_1$ is carried out for a transmission to the terminal i.

If i∈$H_1$, then the mixing takes place by summing $N_1$−1 reconstructed signals of the high sub-band: $S_i^h = \Sigma s_j^h$ with j∈$H_1$−{i}.

In the opposite case, (i∉$H_1$) then the mixing is carried out by summing the $N_1$ reconstructed signals of the high sub-band $S_i^h = \Sigma s_j^h$ with j∈$H_1$.

At the step E408, the high sub-band output binary stream ($Bs_i^h$) intended to be transmitted to the terminal Ti (0≤i<N) is then obtained by coding, with the low sub-band encoder of the G.722 (ADPCM over 2 bits), of the mixed signal $S_i^h$.

Depending on the number of signals to be considered after the steps E401 (optional) and E405, it is sometimes more advantageous to start by performing the summation of the N' signals ($S^l = \Sigma_{j \in V'} s_j^l$; or $S^h = \Sigma_{j \in H_1} s_j^h$) then obtaining the signals to be re-encoded for the output i by subtraction of $s_i^l$ from $S^l$ if i∈V' or of $s_i^h$ from $S^h$ if i∈$H_1$ ($S_i^l = S^l - s_i^l$ or $S_i^h = S^h - s_i^h$). It is noted that, if i∉$H_1$ $S_i^h = S^h$; similarly if i∉V' $S_i^l = S^l$. Instead of calculating by the lower (respectively high) sub-band, N' (resp. $N_1$) sums of N'−1 (resp. $N_1$−1) signals, it is computed a sum of N' (resp. $N_1$) signals then N' (resp. $N_1$) differences—this being 2N'(resp. $2N_1$) calculations instead of N(N'−1) (resp. $N_1(N_1-1)$).

In the following, it will be understood that the term "summation" or "summing" of N−1 signals can refer to the subtraction of a signal from the sum of N signals.

Thus, by taking into account the presence or absence of a high-frequency content in the streams to be combined, this allows the complexity of the decoding E406 and mixing E407 steps to be reduced. Indeed, at the step E406, only the streams having HD content are decoded, hence the number of ADPCM decodings is reduced from N' to $N_1$. Similarly, at the step E407, there are not 2N' (or N(N'−1)) calculations but $2N_1$ (or $N_1(N_1-1)$) calculations.

Moreover, since the signals $S_i^h$ are the same for the outputs i, i∉$H_1$, the number of re-codings at the step E408 can be reduced from N'+1 to $N_1$+1. However, the complexity of the detection of HD content in the input channels at the step E405 needs to be factored in.

A method of low complexity for detection of a frequency band within an audio content may be implemented within the framework of this invention. This method is now described with reference to FIG. 5.

A step E501 determines, as a first stage, by frequency sub-band from a predetermined set of frequency sub-bands, an estimated signal based on the binary stream. For this purpose, steps are implemented for obtaining an adaptation parameter associated with the quantification index for a current sample n and for calculation of an estimated signal for the current sample using this determined adaptation parameter, the signal estimated for the preceding sample and a predefined omission factor. One exemplary embodiment of such a technique for determination of an estimated signal is described in the French patent application FR 11 52596.

This estimated signal is representative of the audio content that has been coded. The predetermined set of sub-bands, in other words the sub-bands considered for estimating these representative signals together with their number M, may be predefined or may vary over time.

In the following, this estimated signal for a sub-band k (0≤k<M) will be denoted: $\tilde{s}_k(n)$, n=0, . . . , $N_k$−1, $N_k$ being the number of samples in a sub-band k.

A step E502 for determination of uncoded parameters representative of the audio content is subsequently implemented. These parameters p(k) are determined by frequency sub-band from the predetermined set of sub-band, using the estimated signal in the corresponding sub-bands.

Several types of parameters may be calculated. A few examples of these are presented hereinafter.

For a sub-band k, a parameter may be determined for example from a norm of the estimated signal (or a power of this norm). Such parameters are given hereinbelow for a given band k ($0 \leq k < M$):

$$L_\infty(k) = \max_{n=0,\ldots,N_k-1}(|\tilde{s}_k(n)|); L_1(k) = \sum_{n=0}^{N_k-1}|\tilde{s}_k(n)|; L_2(k) = \sum_{n=0}^{N_k-1}\tilde{s}_k(n)^2$$

"Normalized" versions may also be used, such as:

$$L'_1(k) = \frac{1}{N_k}\sum_{n=0}^{N_k-1}|\tilde{s}_k(n)|; L'_2(k) = \frac{1}{N_k}\sum_{n=0}^{N_k-1}\tilde{s}_k(n)^2$$

Other types of parameters may also be used, such as a ratio: for example, the ratio between the minimum and the maximum of the estimated signal—in absolute values or otherwise—:

$$\rho_{min\,max}(k) = \frac{\min_{n=0,\ldots,N_k-1}(|\tilde{s}_k(n)|)}{\max_{n=0,\ldots,N_k-1}(|\tilde{s}_k(n)|)};$$

$$\rho'_{min\,max}(k) = \frac{\min_{n=0,\ldots,N_k-1}(\tilde{s}_k(n))}{\max_{n=0,\ldots,N_k-1}(\tilde{s}_k(n))}.$$

Of course, the inverse of this ratio may also be considered.

In one exemplary embodiment, the same parameter is calculated for various sub-bands. However, a parameter might only be calculated over a more restricted number of sub-bands (which could be limited to a single sub-band).

Using at least one of these parameters, the step E503 is implemented for calculating at least one local criterion.

This local criterion may be calculated using parameters of a single sub-band or parameters calculated over more than one sub-band. In order to distinguish these two categories of criterion, they are named according to the number of sub-bands taken into account in the calculation: mono-band criterion and multi-band criterion.

For each category, a few examples of criteria are detailed hereinafter.

A mono-band criterion uses a "distance" between a parameter p(k) of a sub-band k and a threshold $thresh_m(k)$. This threshold may be adaptative or otherwise and may potentially depend on the sub-band in question. The mono-band criterion is then denoted d(k) such that:

$$d(k) = dist(p(k), thresh_m(k))$$

Advantageously, this "distance" is the simple difference between the parameter p(k) and this threshold:

$$d(k) = dist(p(k), thresh_m(k)) = p(k) - thresh_m(k)$$

For example, these mono-band criteria may be defined by the equations hereinbelow, over the sub-bands k and k', ($0 \leq k, k' < M$):

$$crit0_m(k) = dist(L_\infty(k), thresh0_m(k)), crit1_m(k') = dist(L'_1(k'), thresh1_m(k')),$$

where $thresh0_m(k)$ and $thresh1_m(k')$ are thresholds—adaptative or otherwise—and may be dependent on the sub-band in question.

The threshold on the band i could, for example, be adapted as a function of the band j; or as a function of a preceding block of samples.

A multi-band criterion compares parameters calculated over at least two sub-bands—for example, a parameter p(k) of a sub-band i and a parameter q(k') of a sub-band k'.

Here again, as in the case of a mono-band criterion, a threshold $thresh_m(k,k')$—adaptative or otherwise and potentially dependent on the sub-bands in question—may be used.

For example, these multi-band criteria may be defined by the equations hereinbelow, over the sub-bands k and k', ($0 \leq k, k' < M$):

$$crit0_M(k,k') = dist_{th}(dist_p(\rho'_{min\,max}(k), \rho_{min\,max}(k')), thresh0_M(k,k')),$$

$$crit1_M(k,k') = dist'_{th}(dist'_p(L'_1(k), L'_1(k')), thresh1_M(k,k'))$$

Advantageously, a "distance" $dist_{th}$ is a simple difference between a threshold and a distance $dist_p$ between parameters of at least two sub-bands.

The distance $dist_p$ between parameters of at least two sub-bands may use ratios between parameters. For example, in the case of a "distance" between parameters of two sub-bands:

$$dist_p(L'_1(k), L'_1(k')) = L'_1(k)/L'_1(k') \text{ or } dist'_p(L'_1(k), L_\infty(k')) = L'_1(k)/L_\infty(k')$$

It is also noted that the same set of parameters may be used for calculating several criteria both in the case of a mono-band criterion and of a multi-band criterion.

Based on at least one local criterion such as defined, the step E504 is implemented. At this step, a local decision ("instantaneous", denoted $dec_{inst}^{cur}$) is taken while detecting whether the coded audio content comprises frequencies within at least one sub-band.

In one particular embodiment, in the case of detection of a frequency band referred to as high frequency band (i.e. frequencies higher than a frequency threshold $F_{th}$), it is decided whether the audio content comprises frequencies in the sub-bands i such that, $i_{th} \leq k$, where $i_{th}$ is the index of the sub-band including the frequency $F_{th}$. At least one of these sub-bands k is taken into consideration at the decision step.

In the particular example of the G.722 fixed HD voice coder with two sub-bands, when trying to detect if the coded content really is wideband (WB), it is detected whether there is relevant content in the second sub-band (high sub-band) in order to take a decision "Narrow band" NB or "Wide band" WB.

In the case where the predetermined frequency band is not the high frequency band, the decision is of course adapted and the sub-bands considered can be those that are lower than a frequency threshold for detecting a low-frequency band or else those that are defined by frequencies either side of and including this predetermined frequency band.

In order to take this decision, at least one local criterion is useful. As a variant, several criteria may be used alone or jointly.

The decision may be flexible or hard. A hard decision consists in comparing at least one criterion with a threshold and in taking a binary decision or with predefined states on the presence of the frequency band within the sub-band.

A flexible decision consists in using the value of the criterion in order to define, according to a predefined interval of values, a higher or lower probability for the presence of the frequency band within the sub-band in question.

In one particular embodiment, a step for detection of the type of content, for example a vocal content, is first of all carried out in order to only carry out the local detection on the relevant frames, in other words comprising this type of content.

In order to detect this type of content, advantageously, the parameters determined in E502 on the signals representative of the signals in sub-bands are used.

In one variant embodiment, in order to increase the reliability of the detection, the final decision for a current block of samples, denoted $dec^{cur}$, depends not only on the local "instantaneous" detection but also on the past detections. Using flexible or hard local decisions by block, a global decision is taken on a number of K blocks preceding the current block. This number of K blocks is adjustable depending on a compromise reliability of the decision/speed of the decision.

For example, the local detections can be smoothed over several blocks by a window which could be sliding. The dependence of the current decision on the past detections may also be dependent on the reliability of the local decision. For example, if the local decision is estimated to be robust, the dependence of the current decision with respect to past decisions may be minimized or even eliminated.

Several embodiments are possible for the detection method such as described, both in the choice of the parameters, of the criteria, of the way in which to combine potentially several criteria and in the use of a flexible or hard decision, locally or globally. It is thus possible to optimize the compromise complexity/reliability of the detection together with the speed of the detection.

As has been mentioned, this method of detection with a low algorithmic cost of the audio band for a content coded by the G.722 also carries out, in one preferred embodiment, a detection of voice activity. This information is then advantageously used at the step E401 in FIG. 4 for determining the set V'. Similarly, this method estimates with a reduced complexity signals characteristic of the signals in sub-bands using the, or at least a part of the, binary stream and it does this without completely decoding the signals in sub-bands.

Thus, another advantage of this detection technique is that the majority of the calculations necessary for the decoding have already been carried out for the detection. Thus, depending on the compromise storage memory/calculation complexity, the signals used for the detection of HD content (step E405) may be saved in memory in order to be used to reduce the complexity of the steps for decoding the signals of the low (step E402) and high (step E406) sub-bands.

The method of mixing according to the invention is applicable to the combination of streams coded by coders operating over various bandwidths (medium band, super-wide band, HiFi band, etc.). For example, in the case of a "super-HD" coder (with four sub-bands coded by ADPCM technology), as described for example in the document by the authors A. Charbonnier, J. P. Petit, entitled "Sub-band ADPCM coding for high quality audio signals" in ICASSP 1988, pp. 2540-2543, the application of the invention may consist in carrying out a direct recombination of the signals of the two low sub-bands (corresponding to the wide band [0-8 kHz]) and in recombining the signals of the two high sub-bands (corresponding to the audio band [8-16 kHz]) selected after detection of super-HD content. Another example of application of the invention to this super-HD coder consists in combining the signals of the lowest sub-band (corresponding to the narrow band [0-4 kHz]), in recombining the signals of the second sub-band (corresponding to the audio band [4-8 kHz]) selected after detection of HD content, and in recombining the signals of the two high sub-bands (corresponding to the audio band [8-16 kHz]) having been selected after detection of super-HD content.

Figure 6:
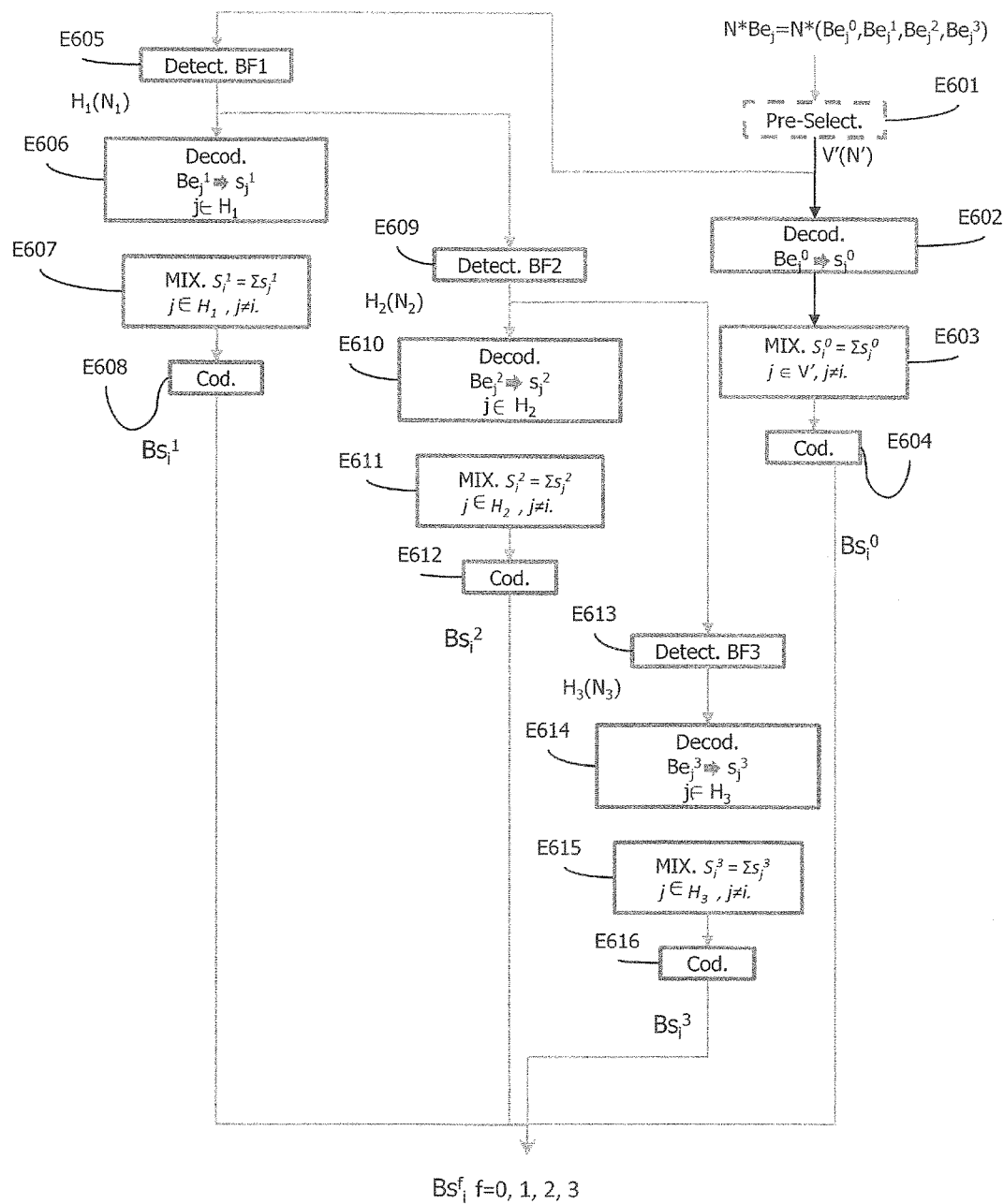
FIG. 6 illustrates the steps of one particular embodiment for streams coded by a super-HD coder using four sub-bands and implemented in a centralized bridge.

FIG. 6 illustrates this application example. In this exemplary embodiment, the method of mixing is implemented in a mixing device using a centralized architecture comprising a bridge combining streams coded by a "super-HD" coder—with four sub-bands coded by ADPCM technology. This coder is a sub-band coder, the signals of the four (M=4) sub-bands being coded by ADPCM technology.

Figure 5:
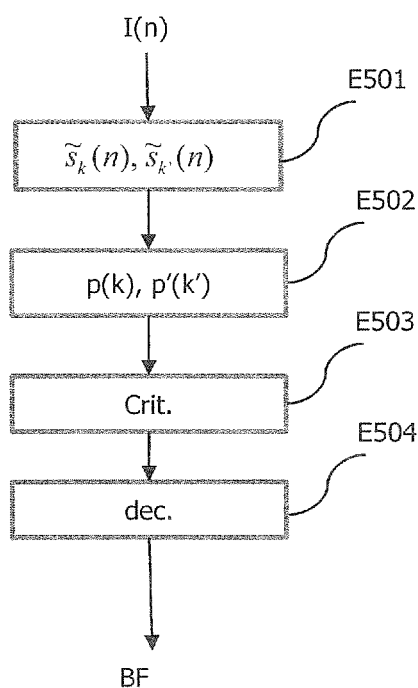
FIG. 5 illustrates the steps implemented in one embodiment for the step for detection of a predetermined frequency band according to the invention.

In order to limit the complexity, in this embodiment, the technique described with reference to FIG. 5 is used for detecting whether a stream is active or not and whether it contains HD and/or super-HD content. As in the preceding embodiment, the estimated signals for the detection of HD and super-HD content may be stored in memory in order to be used for the decoding, in order to reduce the complexity of the steps for decoding the signals of the sub-bands.

Using N hierarchical binary streams or input channels, coded in this embodiment by ADPCM-4SB technology, an optional pre-selection step E601 is implemented.

This pre-selection step allows the selection from amongst the various input channels, those that meet one or more of the selection criteria described previously for the methods of the prior art. For example, using the detection of voice activity, the FCFS criterion (for "First Come First Serve" in English) is used for selecting streams. Or else, based on the measurement of the power of the signal or of its energy, the LT criterion (for "Loudest Talker" in English) is used for selecting the streams with the highest intensity.

Thus, a part (N' with N'≤N) of the coded streams received by the mixing device or mixing bridge is taken into account for implementing the method of mixing. This therefore reduces the complexity of implementation of the steps of the method since the number of channels to be mixed is limited.

This pre-selection step is optional and the decoding step E602 may also be applied to all N of the input coded audio streams. V' denotes the set of the input channels being considered, consisting of either the N' input channels if the optional pre-selection step is implemented, or of the N input channels otherwise.

As previously, the notation N' (with N'≤N) is used whether the optional step E601 is implemented or not. Similarly, the pre-selection may be applied as a variant or as a complement after the step for decoding the low sub-band.

The step E602 for decoding the N' streams in the low sub-band is subsequently implemented.

For the set V', for each channel j of input (j∈V'), the following notations are used:

$Be_j^f$, f=0, . . . , 3 the incoming binary stream of the sub-band f (corresponding to the audio band [4f-4(f+1) kHz]

$s_j^f$ the reconstructed signal of the sub-band f obtained by decoding the stream $Be_j^f$ Also, for each output channel i (0≤i<N): $Bs_i^f$ denotes the outgoing binary stream for the sub-band f, f=0, . . . , 3.

At the decoding step E602, the reconstructed signal $S^0$ of the lowest sub-band (corresponding to the narrow band [0-4 kHz]) is obtained by decoding the stream $Be_j^0$ (j∈V').

At the step E603, a procedure for mixing the binary streams thus decoded is carried out by summing N'-1 signals thus reconstructed of the low sub-band: $S_i^0 = \Sigma s_j^0$ with j∈V', j≠i for a transmission of the stream to the terminal i.

If the pre-selection step E601 is carried out and if i∈V', then the mixing takes place by addition of N'-1 reconstructed signals of the sub-band 0: $S_i^0 = \Sigma s_j^0$ with j∈V'-{i}.

In the opposite case, (i∉V') the mixing is then carried out by summation of the N' constructed signals of the sub-band 0: $S_i^0 = \Sigma s_j^0$ with j∈V'.

The low sub-band output binary stream ($Bs_i^0$) intended to be transmitted to a terminal Ti (0≤i<N) is then obtained by coding this sum signal $S_i^0$ at the step E604, using the ADPCM coder.

Using the N' input channels, a step E605 for detection of a first predetermined frequency band BF1 is carried out. In this embodiment, the first predetermined frequency band is the frequency sub-band [4-8 kHz]. Thus, an analysis of the audio content of the set V' of the input channels is carried out. The method described with reference to FIG. 5 is for example implemented for detecting this first frequency band BF1.

Thus, a sub-set $H_1$ of $N_1$ input channels with HD content is selected at the output of the step E605. The set $H_1$ is included in the set V' ($H_1 \subset V'$) of the input channels being considered (in other words in the set of the N' preselected input channels if the pre-selection step E601 is carried out; otherwise in the set of the N input channels).

It goes without saying that other modes of detection of the presence of the band BF1 are possible.

At the decoding step E606, the $N_1$ reconstructed signals $s_j^1$ of the high sub-band or sub-band 1 are obtained by decoding sub-band 1 binary streams $Be_j^1$, j∈$H_1$.

At the step E607, a mixing of the decoded streams of the set $H_1$ is carried out for a transmission to the terminal i.

If i∈$H_1$, then the mixing is done by summing $N_1$−1 reconstructed signals of the sub-band 1: $S_i^1 = \Sigma s_j^1$ with j∈$H_1$−{i}.

In the opposite case, (i∉$H_1$), the mixing is then carried out by summing the $N_1$ reconstructed signals of the sub-band 1: $S_i^1 = \Sigma s_j^1$ with j∈$H_1$.

At the step E608, the binary stream of output sub-band 1 ($Bs_i^1$) designed to be transmitted to the terminal Ti is then obtained by coding by the encoder ADPCM high sub-band, of the mixed signal $S_i^1$.

Starting from the set $H_1$ determined at the step E605, a step E609 of detection of a second predetermined frequency band BF2 is carried out. The second frequency band BF2 is, in this exemplary embodiment, the sub-band [8-12 kHz]. The detection method in FIG. 5 is for example used. Thus, a sub-set $H_2$ included in $H_1$ ($H_2 \subset H_1$) of $N_2$ input channels having content in the sub-band [8-12 kHz] is determined.

At the decoding step E610, the $N_2$ reconstructed signals $s_j^2$ of the sub-band 2 are obtained by decoding sub-band 2 binary streams $Be_j^2$, j∈$H_2$.

At the step E611, a mixing of the decoded streams of the set $H_2$ is carried out for a transmission to the terminal i.

If i∈$H_2$, then the mixing is done by summing $N_2$−1 reconstructed signals of the sub-band 2: $S_i^2 = \Sigma s_j^2$ with j∈$H_2$−{i}.

In the opposite case, (i∉$H_2$) the mixing is then carried out by summing the $N_2$ reconstructed signals of the sub-band 2: $S_i^2 = \Sigma s_j^2$ with j∈$H_2$.

At the step E612, the output binary stream of the sub-band 2 ($Bs_i^2$), intended to be transmitted to the terminal Ti, is then obtained by coding the mixed signal $S_i^2$ using the ADPCM coder of the sub-band 2.

Using the set $H_2$ determined at the step E609, a step E613 for detection of a third predetermined frequency band BF3 is carried out. The third frequency band BF3 is, in this exemplary embodiment, the sub-band [12-16 kHz]. The detection method in FIG. 5 is for example used. Thus, a sub-set $H_3$ included in $H_2$ ($H_3 \subset H_2$) of $N_3$ input channels having content in the sub-band [12-16 kHz] is determined.

At the decoding step E614, the $N_3$ reconstructed signals $s_j^3$ of the sub-band 3 are obtained by decoding binary streams of the sub-band 3: $Be_j^3$, j∈$H_3$.

At the step E615, a mixing of the decoded streams of the set $H_3$ is carried out for a transmission to the terminal i.

If i∈$H_3$, then the mixing is done by summing $N_3$−1 reconstructed signals of the sub-band 3: $S_i^3 = \Sigma s_j^3$ with j∈$H_3$−{i}.

In the opposite case, (i∉$H_3$), the mixing is then carried out by summing the $N_3$ reconstructed signals of the sub-band 3: $S_i^3 = \Sigma s_j^3$ with j∈$H_3$.

At the step E616, the output binary stream of sub-band 3 ($Bs_i^3$) designed to be transmitted to the terminal Ti is then obtained by coding the mixed signal $S_i^3$ by the ADPCM coder of the sub-band 3.

Several mixed streams coded are thus obtained ($Bs_i^f$, f=0, . . . , 3) for the four sub-bands f (f=0, . . . , 3). These mixed streams are transmitted to a terminal Ti (0≤i<N). A step for combining these mixed streams may be carried out prior to transmission.

Thus, taking into account the presence or absence of a content in the high frequency sub-bands (sub-bands 1, 2, 3) in the streams to be combined allows the complexity of the steps for decoding E606, E610 and E614, for mixing E607, E611 and E615 and for coding E608, E612 and E616 to be reduced.

Indeed, at the steps E606, E610 and E614, with f such that f=1, 2 or 3, only the streams of the sub-sets $H_f$ are decoded, hence the number of decodings ADPCM is reduced from N' to $N_f$. Similarly, at the steps E607, E611 and E615, there are not 2N'(or N(N'−1)) calculations but $2N_f$ (or $N_f^2$). Furthermore, since the signals $S_i^f$ are the same for the outputs i, i∉$H_f$, the number of re-codings at the steps E608, E612 and E616, can be reduced from N' to $N_f$+1.

It should also be noted that only carrying out the procedure for detection of a frequency band BFf within the sub-set of the input channels selected for the lower frequency band BF(f−1), also reduces the complexity of the steps for detection of the various frequency bands (E609 and E613).

Moreover, as previously mentioned, certain calculations necessary for the decoding have already been able to be performed at the detection step and are thus re-usable for the decoding if the input is selected. This therefore further reduces the complexity of the calculation of the method.

Another exemplary embodiment of the method of mixing according to the invention is now described. This embodiment describes the implementation of the invention in a mixing device comprising a bridge combining streams coded by the UIT-T G.711.1 coder at 96 kbit/s.

Figure 7:
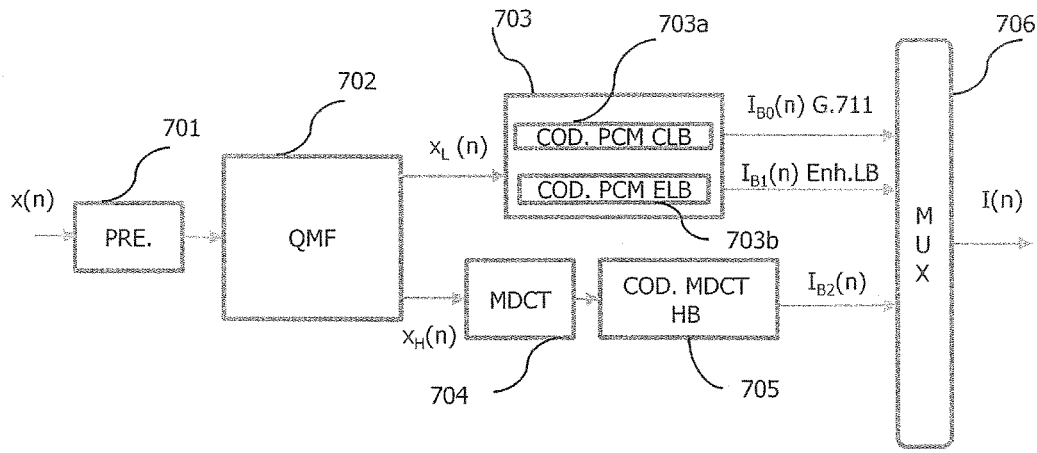
FIG. 7 illustrates a coder of the G.711.1 type delivering streams able to be mixed according to the method of the invention.

This type of coder, illustrated in FIG. 7, is a sub-band coder, the low sub-band is coded hierarchically at 80 kbit/s (10 bits per sample) with a core coding at 64 kbit/s (8 bits per sample) and an improvement layer at 16 kbit/s (i.e. 2 bits per sample on average) and the high sub-band at 16 kbit/s (2 bits per sample on average). It is also described in the aforementioned document: "Rec. IUT-T G.711.1, Wideband embedded extension for G.711 pulse code modulation, 2008".

The G.711.1 coder operates on audio signals sampled at 16 kHz over blocks or frames of 5 ms (i.e. 80 samples at 16 kHz). The input signal x(n) is divided into 2 sub-bands [0, 4 kHz] and [4, 8 kHz] by filters QMF shown in 702 potentially after a pre-processing (in order for example to eliminate the DC component by high-pass filtering) in 701. With two input samples, the filter QMF produces a sample $x_L(n)$ of low sub-band (0-4000 Hz) and a sample $x_H(n)$ of high sub-band (4000-8000 Hz) at the output. The data rate of 64 kbit/s ("Layer 0" compatible with the G.711) corresponds to the quantification of the sub-band [0, 4 kHz] by the PCM (Pulse-Code Modulation) technique equivalent to the G.711, with a conditioning of the quantification noise. The next two layers (Layers 1 and 2) respectively code the low sub-band [0, 4 kHz] by a PCM coding improvement technique, and the high sub-band [4, 8 kHz] by an MDCT (for Modified Discrete Cosine Transform) coding, each with a data rate of 16 kbit/s (80 bits per frame). When the decoder receives these improvement layers, it can improve the quality of the decoded signal.

The core coding of the low sub-band signal is carried out by the module 703a according to the PCM technique equivalent to the G.711, with a conditioning of the quantification noise. The PCM coding used in the G.711 is briefly recalled hereinafter.

The G.711 coder is based on a logarithmic compression over 8 bits at the sampling frequency of 8 kHz, to yield a data rate of 64 kbit/s. The PCM G.711 coding applies a compression of the filtered signals in the band [300-3400 Hz] by a logarithmic curve which allows a just about constant signal-to-noise ratio to obtained for a wide dynamic range of signals. The quantification resolution varies with the amplitude of the sample to be coded: when the level of the input signal is low, the quantification step is small, when the level of the input signal is high, the quantification step is large. Two logarithmic PCM compression laws are used: the µ law (used in North America and in Japan) and the A law (used in Europe and in rest of the world). The G.711 A law and the G.711µ law encode the input samples over 8 bits. In practice, in order to facilitate the implantation of the G.711 coder, the logarithmic PCM compression has been approximated by a segmented curve. During this compression, the least-significant bits of the mantissa are lost.

In the A law, the 8 bits are laid out in the following fashion:
  1 sign bit
  3 bits indicating the segment,
  4 bits indicating the location in the segment.

The coding of the improvement layer (Layer 1) of the low sub-band (carried out by the module 703b in FIG. 7) allows the quantification error of the core layer ("Layer" 0) based on G.711 to be reduced by adding additional bits to the samples coded in G.711 (Enh.LB). This technique, which allows an increase in the SNR (Signal-to-Noise Ratio) of 6 dB to be obtained for each bit added per sample consists in saving and in transmitting in an improvement binary stream the most-significant bits from amongst the bits lost during the initial PCM coding.

The recovery and the transmission of bits not transmitted in the mantissa of the PCM core coding improves the quality of the coding of the low sub-band. Indeed, in the case of reception of this improvement layer, the decoder can decode the mantissa with a higher precision. In the G.711.1, the number of additional bits for the mantissa depends on the amplitude of the samples: indeed, rather than allocating the same number of bits for improving the precision of the mantissa coding of the samples, the 80 bits available in the layer 1 of the G.711.1 for improving the precision of the mantissa coding of the 40 samples are allocated dynamically: more bits being assigned to the samples with a high exponent. Thus, whereas the budget of bits for the improvement layer is 2 bits per sample on average (16 kbit/s), with this adaptative allocation, the number of bits allocated to a sample varies according to its exponent value from 0 to 3 bits.

For the high sub-band, a modified discrete cosine transform (MDCT) is firstly carried out by the module 704, over blocks of the signal from the high band of 10 ms with an overlap of 5 ms. Then, the MDCT coefficients, $S_{HB}(k)$, are coded by the module 705, using a vector quantification with an interleaved conjugate structure, and these coefficients are subsequently weighted then normalized (by the square route of their energy). These coefficients are then distributed into 6 sub-vectors with 6 dimensions, the 4 coefficients representing the highest frequencies are not coded. These six sub-vectors are quantified independently over 12 bits by a set of two dictionaries with a conjugate structure, $C_{H0w}$ and $C_{H1w}$. Lastly, one overall gain per frame is calculated using the decoded sub-vectors and the normalization factor, this gain being quantified over 8 bits by a scalar quantifier of the p-law PCM type.

The various coding layers (with the indices $I_{B0}(n)$, $I_{B1}(n)$, $I_{B2}(n)$) are multiplexed in 706 so as to yield the coded signal I(n).

In the decoder, the set of the 36 MDCT coefficients is reconstructed based on the six sub-vectors decoded with inverse interleaving and the 4 coefficients representing the highest uncoded frequencies are simply set to zero, then the signal of the decoded high band is generated by inverse MDCT transform.

In the two preceding embodiments, a detection of high frequency content with a low algorithmic cost is used and makes use of the signals estimated during this detection in order to reduce the complexity of the decoding of the signals with sub-bands selected for the recombination. In this third embodiment, it is shown that, even when the method of detection is a conventional method, the invention allows the complexity of the recombination of streams to be reduced. For this purpose, the application of the invention to the UIT-T G.711.1 coder such as described with reference to FIG. 7 is illustrated.

In this embodiment, the method of detection of an HD content in an input stream uses a comparison of the energy of the decoded signal of the high sub-band with that of the decoded signal of the low sub-band.

Figure 8:
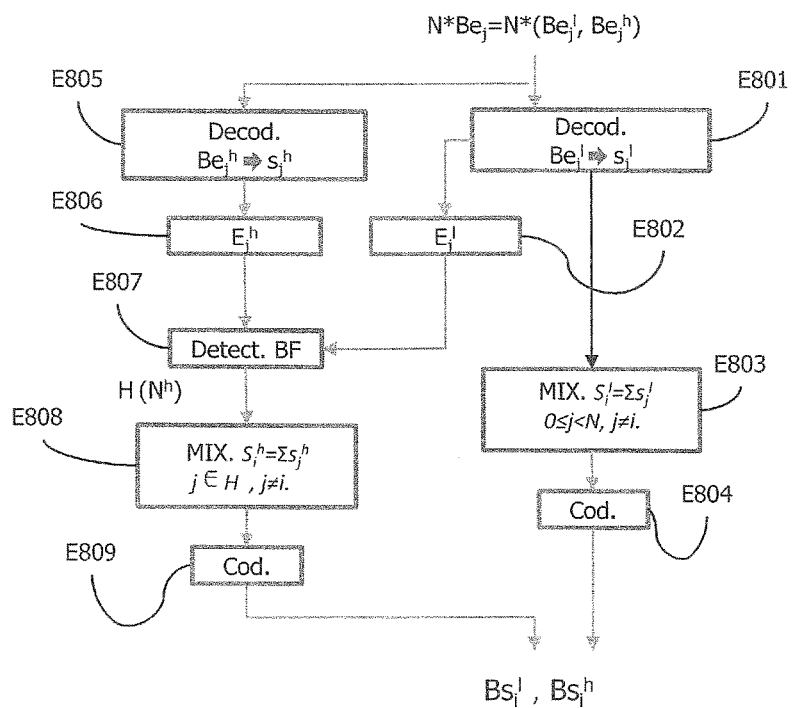
FIG. 8 illustrates the steps of one particular embodiment for coded streams of the G.711.1 type and implemented in a centralized bridge.

FIG. 8 illustrates this exemplary embodiment. Taking therefore a bridge having N input channels (receiving N hierarchical binary streams coded by the G.711.1 at 96 kbit/s), for each input channel of (0≤j<N) the following notations are used:
  $Be_j^l$ the binary stream of the incoming low sub-band (core layer+improvement layer 1);
  $Be_j^h$ the binary stream of the incoming high sub-band (improvement layer 2);
  $s_j^l$ the reconstructed signal of the low sub-band obtained by decoding the stream $Be_j^l$;
  $s_j^h$ the reconstructed signal of the high sub-band obtained by decoding the stream $Be_j^h$;

For each output channel (0≤i<N), the following notations are used:
  $Bs_i^l$ the binary stream of the outgoing low sub-band; and
  $Be_i^h$ the binary stream of the outgoing high sub-band.

Thus, starting from the N coded streams received by the mixing device, a step E801 for decoding the binary streams of the low sub-band $Be_j^l$, 0≤j<N is carried out so as to obtain N signals $s_j^l$ of the low sub-band.

Similarly, at the step E805, N signals of the high sub-band $s_j^h$ are obtained by decoding binary streams of the high sub-band $Be_j^h$, 0≤j<N.

So as to carry out a detection of a predetermined frequency band on the audio content of the signals thus decoded, a first step E802 for calculating the energies $E_j^l$ (0≤j<N) of the decoded low sub-band signals is carried out.

A step E806 for calculation of the energies $E_j^h$ ($0 \leq j < N$) of the decoded high sub-band signals is also implemented.

The step E807, performs a calculation of the differences between the energies of the two sub-bands, in the logarithmic domain (dB)—or of their ratios in the linear domain; $0 \leq j < N$.

This comparison between the energies of the two sub-bands allows the presence of a predetermined frequency band to be detected in the content, for example a high frequency band.

Thus, at the step E807, a set H of the input channels having HD content is determined. $N^h$ denotes the cardinal of the set H.

At the step E808, a mixing of the decoded streams of the set H is carried out for a transmission to the terminal i.

If $i \in H$, then the mixing is done by summing $N^h-1$ reconstructed signals of the high sub-band: $S_i^h = \Sigma s_j^h$ with $j \in H-\{i\}$.

In the opposite case, ($i \notin H$) the mixing is then carried out by summing the $N^h$ reconstructed signals of the high sub-band: $S_i^h = \Sigma s_j^h$ with $j \in H$.

At the step E809, the high sub-band output binary stream ($Bs_i^h$), intended to be transmitted to the terminal Ti, is then obtained by coding this sum signal $S_i^h$ using the high sub-band encoder of the G.711.1

Similarly, at the step E803, the summing of N−1 reconstructed signals of the low sub-band is carried out: $S_i^l = \Sigma s_j^l$; $0 \leq j < N$, $j \neq i$.

At the step E804, the low sub-band output binary stream $Bs_i^l$, intended to be transmitted to the terminal Ti is then obtained by coding this sum signal $S_i^l$ using the low sub-band encoder of the G.711.1, A step for combining these two mixed streams may be carried out prior to transmission.

With respect to a direct recombination in the domain of the decoded signals of the sub-bands, by taking into account the presence or absence of a high frequency content in the streams to be combined, the invention allows the complexity of the steps E808 and E809 to be reduced.

Indeed, at the step 808, there are only $N^h+1$ sum signals to be calculated: the signal $S^h$ being common to the outputs i such that $i \notin H$. Furthermore, the signal $S^h$ only comprises $N^h$ signals and the $N^h$ sum signals $S_i^h$ of the outputs i such that $i \in H$ only comprise $N^h-1$ signals.

Similarly, at the step 809, the number of re-codings may be reduced. In order to reduce the complexity even more, as in the prior art, the MDCT transforms needed for the re-coding of the combined signals of the high sub-band (step 809) will be able to be eliminated by storing in memory, at the step E805, the high sub-band signals in the MDCT domain and by carrying out the summations of the step E808 in the MDCT domain.

Thus, although the invention has been illustrated in embodiments in mixing bridges, it will be understood that it can be implemented in any device having to combine streams from sub-band coders. For example, the invention may advantageously be used in a terminal in a multi-party communication using a mesh architecture or a centralized architecture using a replicating bridge, in order to reduce the number of decodings and summations.

Figure 9A:
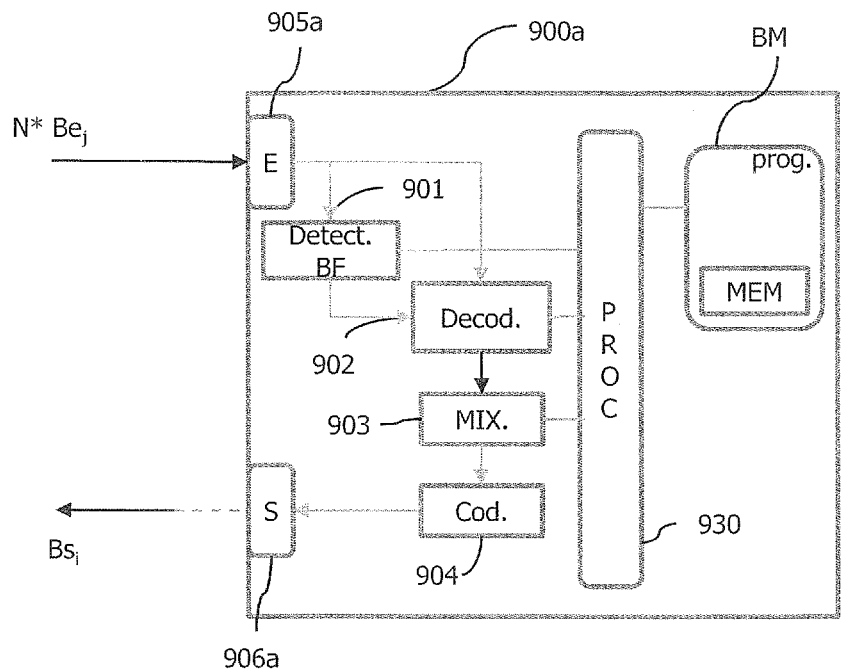
FIGS. 9a and 9b illustrate hardware representations of mixing devices according to embodiments of the invention.
Figure 9B:
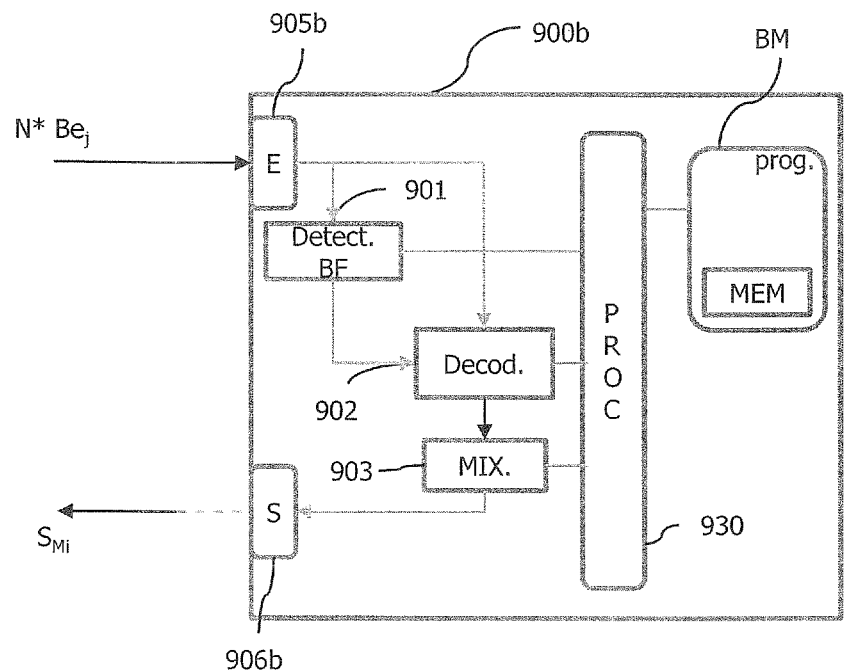

FIGS. 9a and 9b show mixing devices 900a and 900b in exemplary embodiments of the invention. These devices implement the method of mixing such as described with reference to FIG. 2 by the main steps E201 to E205.

The device 900a in FIG. 9a may be more particularly associated with a centralized bridge such as a conference bridge in a communications system comprising a plurality of terminals. The device 900b in FIG. 9b, on the other hand, may be more particularly associated with a terminal or communications gateway.

In terms of hardware, these devices comprise a processor 930 cooperating with a memory block BM comprising a storage and/or working memory MEM.

The processor controls processing modules capable of implementing the method according to the invention. Thus, these devices comprise a module 902 for decoding a part of the coded streams over at least a first frequency sub-band, a module 903 for summing the streams thus decoded so as to form a first mixed stream. It also comprises a module 901 for detection, over at least a second frequency sub-band different from the at least first sub-band, of the presence of a predetermined frequency band within the plurality of coded audio streams. The module 902 also decodes coded audio streams for which the presence of the predetermined frequency band has been detected, over said at least a second sub-band and the mixing module 903 also adds together these decoded audio streams so as to form at least a second mixed stream.

The memory block may advantageously comprise a computer program (prog.) comprising code instructions for the implementation of the steps of the method of mixing in the sense of the invention, when these instructions are executed by the processor PROC and notably the steps for decoding a part of the coded streams over at least a first frequency sub-band, for summing the streams thus decoded so as to form at least a first mixed stream, for detecting, over at least a second frequency sub-band different from the at least first sub-band, the presence of a predetermined frequency band within the plurality of coded audio streams and for summing the decoded audio streams for which the presence of the predetermined frequency band has been detected, over said at least a second sub-band so as to form at least a second mixed stream.

Typically, the description in FIG. 2 is based on the steps of an algorithm for such a computer program. The computer program may also be stored on a memory media readable by a reader of the device or downloadable into the memory space of the latter.

Generally speaking, the memory MEM stores all the data necessary for the implementation of the method of mixing.

The device 900a in FIG. 9a furthermore comprises a coding module 904 capable of implementing the steps E206a and E207a in FIG. 2, in order to obtain the output binary streams of the sub-bands Bsi intended to be transmitted to the terminal Ti via an output module 906a.

This device 900a also comprises an input module of 905a designed to receive a plurality of coded audio streams $N*Be_j$ originating for example from the various terminals of the communications system, these streams having been coded by a coder using frequency sub-band coding.

The device 900b in FIG. 9b comprises an input module of 905b designed to receive a plurality of coded audio streams $N*Be_j$ originating for example from the various communications channels, these streams having been coded by a coder using frequency sub-band coding.

This device 900b also comprises an output module 906b designed to transmit the stream $S_{Mi}$, resulting from the combination of the mixed streams by the module 903, to the reproduction system of the device or of the terminal.

The invention claimed is:

1. A method for mixing a plurality of coded audio streams according to a coding by frequency sub-bands, comprising:
   receiving a plurality of audio streams coded according to a frequency sub-band coding;

decoding of a part of the received audio streams over at least a first frequency sub-band;

summing of the streams thus decoded so as to form at least a first mixed stream;

detecting, over at least a second frequency sub-band different from the at least first sub-band, the presence of a predetermined frequency band within the plurality of coded audio streams;

decoding audio streams for which the presence of the predetermined frequency band has been detected;

summing of the decoded audio streams for which the presence of the predetermined frequency band has been detected, over said at least second sub-band, so as to form at least a second mixed stream; and transmitting the second mixed stream.

2. The method as claimed in claim 1, further comprising pre-selecting the coded audio streams according to a predetermined criterion, prior to detecting the presence of a predetermined frequency band within the plurality of coded audio streams.

3. The method as claimed in claim 1, further comprising re-coding the first mixed stream and the second mixed streams.

4. The method as claimed in claim 1, wherein decoding over at least a first frequency band is carried out over low frequency sub-bands and the predetermined frequency band detected over at least a second frequency sub-band is a frequency band higher than said low frequency sub-bands.

5. The method as claimed in claim 1, wherein detecting the presence of a predetermined frequency band within a coded stream is done by a comparison of energy, within the various frequency sub-bands, of the decoded audio streams.

6. The method as claimed in claim 1, wherein detecting the presence of a predetermined frequency band within a coded stream is done according to the following steps:

determination, by frequency sub-band from a predetermined set of sub-bands, of an estimated signal based on the coded stream;

determination, by frequency sub-band from the predetermined set of sub-bands, of uncoded parameters representative of the audio content, based on the corresponding estimated signal;

calculation of at least one local criterion using the determined parameters;

decision with respect to the presence of a predetermined frequency band within at least one sub-band of the audio content as a function of the at least one local criterion calculated.

7. The method as claimed in claim 6, wherein at least a part of the determined parameters, representative of the audio content, is saved in memory for a later use during the decoding of the audio streams to be mixed.

8. The method as claimed in claim 1, further comprising:

several steps for detecting predetermined frequency bands within coded audio streams, the detection of a first predetermined frequency band within a first sub-band allowing a first set of coded audio streams to be obtained, the detection of a second predetermined frequency band within a second sub-band allowing a second set of coded audio streams to be obtained included in the first set; and steps for summation of decoded audio streams for each of the sets of coded audio streams obtained.

9. A device for mixing a plurality of coded audio streams according to a frequency sub-band coding, comprising a non-transitory computer-readable medium comprising instructions stored thereon, and a processor configured by the instructions to control:

an input module configured to receive a plurality of audio streams coded according to a frequency sub-band coding;

a decoding module for decoding a part of the received audio streams over at least a first frequency sub-band;

a summing module for summing the streams thus decoded so as to form at least a first mixed stream;

a detecting module for detecting, over at least a second frequency sub-band different from the at least first sub-band, the presence of a predetermined frequency band within the plurality of coded audio streams;

the decoding module for decoding audio streams for which the presence of the predetermined frequency band has been detected;

the summing module for summing the decoded audio streams for which the presence of the predetermined frequency band has been detected, over said at least a second frequency sub-band, so as to form at least a second mixed stream; and an output module configured to transmit the second mixed stream.

10. A conference bridge comprising a mixing device for mixing a plurality of coded audio streams according to a frequency sub-band coding, comprising a non-transitory computer-readable medium comprising instructions stored thereon, and a processor configured by the instructions to control:

an input module configured to receive a plurality of audio streams coded according to a frequency sub-band coding;

a decoding module for decoding a part of the received audio streams over at least a first frequency sub-band;

a summing module for summing the streams thus decoded so as to form at least a first mixed stream;

a detecting module for detecting, over at least a second frequency sub-band different from the at least first sub-band, of the presence of a predetermined frequency band within the plurality of coded audio streams;

the decoding module for decoding audio streams for which the presence of the predetermined frequency band has been detected;

the summing module for summing the decoded audio streams for which the presence of the predetermined frequency band has been detected, over said at least a second frequency sub-band, so as to form at least a second mixed stream; and an output module configured to transmit the second mixed stream.

11. A communications device comprising a mixing device for mixing a plurality of coded audio streams according to a frequency sub-band coding, comprising a non-transitory computer-readable medium comprising instructions stored thereon, and a processor configured by the instructions to control:

an input module configured to receive a plurality of audio streams coded according to a frequency sub-band coding;

a decoding module for decoding a part of the received audio streams over at least a first frequency sub-band;

a summing module for summing the streams thus decoded so as to form at least a first mixed stream;

a detecting module for detecting, over at least a second frequency sub-band different from the at least first sub-band, the presence of a predetermined frequency band within the plurality of coded audio streams;

the decoding module for decoding audio streams for which the presence of the predetermined frequency band has been detected;

the summing module for summing the decoded audio streams for which the presence of the predetermined frequency band has been detected, over said at least a second frequency sub-band, so as to form at least a second mixed stream; and an output module configured to transmit the second mixed stream.

12. The communications device as claimed in claim 11, wherein the communications device is a communications gateway.

13. The communications device as claimed in claim 11, wherein the communications device is a communications terminal.

14. A non-transitory computer-readable storage media that can be read by a processor, on which a computer program is stored comprising code instructions for execution of steps of a method of mixing a plurality of coded audio streams according to a coding by frequency sub-bands, the method comprising the following steps performed by the processor as configured by the instructions:

receiving a plurality of audio streams coded according to a frequency sub-band coding;

decoding of a part of the audio streams received over at least a first frequency sub-band;

summing of the streams thus decoded so as to form at least a first mixed stream;

detecting, over at least a second frequency sub-band different from the at least first sub-band, the presence of a predetermined frequency band within the plurality of coded audio streams;

the decoding module for decoding audio streams for which the presence of the predetermined frequency band has been detected;

summing of the decoded audio streams for which the presence of the predetermined frequency band has been detected, over said at least a second frequency sub-band, so as to form at least a second mixed stream; and transmitting the second mixed stream.

* * * * *

UNITED STATES PATENT AND TRADEMARK OFFICE
CERTIFICATE OF CORRECTION

PATENT NO. : 10,242,683 B2
APPLICATION NO. : 14/773305
DATED : March 26, 2019
INVENTOR(S) : Arnault Nagle et al.

It is certified that error appears in the above-identified patent and that said Letters Patent is hereby corrected as shown below:

In the Specification

Column 2, Line 22, please replace "$j \neq 0$" with -- $j \neq i$ --.

Column 2, Line 26, please replace "$j \neq 1$" with -- $j \neq i$ --.

Column 4, Line 42, please replace "$(i \in V')$" with -- $(i \notin V')$ --.

Column 4, Line 54, please replace "$(i \in V')$" with -- $(i \notin V')$ --.

Column 11, Line 7, please replace "(with N'N)" with -- (with $N' \leq N$) --.

Column 12, Line 35, please replace "(or N(N'-1))" with -- (or N'(N'-1)) --.

Column 18, Line 31, please replace "(or N(N'-1))" with -- (or N'(N'-1)) --.

Column 20, Line 15, please replace "p-law PCM type" with -- μ-law PCM type --.

Signed and Sealed this
Twenty-sixth Day of November, 2019

Andrei Iancu
*Director of the United States Patent and Trademark Office*